(12) United States Patent
Piantoni et al.

(10) Patent No.: US 12,472,106 B2
(45) Date of Patent: Nov. 18, 2025

(54) APPARATUS AND METHOD FOR MUTUALLY WELDING AT LEAST TWO ELEMENTS OF AN ABSORBENT SANITARY ITEM

(71) Applicant: GDM S.p.A, Bologna (IT)

(72) Inventors: Matteo Piantoni, Albino (IT); Alessandro Zavalloni, Sesto ed Uniti (IT)

(73) Assignee: GDM S.p.A., Bologna (IT)

( * ) Notice: Subject to any disclaimer, the term of this patent is extended or adjusted under 35 U.S.C. 154(b) by 148 days.

(21) Appl. No.: 18/488,306

(22) Filed: Oct. 17, 2023

(65) Prior Publication Data
US 2024/0122766 A1    Apr. 18, 2024

(30) Foreign Application Priority Data

Oct. 18, 2022   (IT) .......................... 102022000021456

(51) Int. Cl.
*A61F 13/15*   (2006.01)

(52) U.S. Cl.
CPC ................... *A61F 13/15577* (2013.01); *A61F 2013/15869* (2013.01)

(58) Field of Classification Search
CPC .......... A61F 13/15577; A61F 13/15739; A61F 13/15699; A61F 2013/15869; B29C 65/08
USPC ....................................................... 156/73.1
See application file for complete search history.

(56) References Cited

U.S. PATENT DOCUMENTS 11,351,737 B2 *   6/2022   Lohoff .................... B29C 66/41

FOREIGN PATENT DOCUMENTS

| EP | 3692959 A1 | 8/2020 |
|---|---|---|
| JP | 2019 104224 A | 6/2019 |

OTHER PUBLICATIONS

Italian Search Report in related Italian Application No. 202200021456; dated Oct. 18, 2022, 7 pages.

* cited by examiner

*Primary Examiner* — James D Sells
(74) *Attorney, Agent, or Firm* — Dilworth IP, LLC

(57) ABSTRACT

An apparatus for mutually welding at least two elements of an absorbent sanitary item, including a supporting structure, a first welding member including a first welding surface, and a second welding member including a second welding surface. The second welding member is movable with respect to the first welding member between a non-operating position, in which the second welding surface is spaced apart from the first welding surface to allow at least two elements of the absorbent sanitary item to be positioned above the first welding surface, and a welding position, in which the second welding surface is in contact with the first welding surface to allow welding the at least two elements. One of the welding members includes a yielding coupling element configured to allow a relative displacement between the first and second welding surfaces as a result of the mutual contact between the second and first welding members.

7 Claims, 4 Drawing Sheets

APPARATUS AND METHOD FOR MUTUALLY WELDING AT LEAST TWO ELEMENTS OF AN ABSORBENT SANITARY ITEM

FIELD OF THE INVENTION

The present invention relates to an apparatus and method for mutually welding at least two elements of an absorbent sanitary item.

BACKGROUND OF THE INVENTION

Absorbent sanitary items, such as baby nappies, absorbent sanitary items for women, diapers and napkins for incontinent persons and the like typically have a front part, which can be worn on the front of the user's body, a back part, which can be worn on the back of the user's body, and a middle part arranged between the front and the back and wearable between the user's legs.

Structurally, an absorbent sanitary item comprises a plurality of elements which must be mutually associated and/or welded.

Typically, an absorbent sanitary item comprises two primary elements extending longitudinally from the front part to the back part of the adsorbent sanitary item. The primary elements include an upper element and a lower element, respectively called "topsheet" and "backsheet" in the jargon of the sector, which are mutually overlapped and constrained to each other. Both the upper element and the lower element are substantially rectangular in shape.

The upper element is overlapped to the lower element and is configured to be arranged in a position close to the user's body when the absorbent sanitary item is worn by the user. The upper element comprises a central portion which, in use, comes into contact with the user's skin, or is close thereto, so as to form an empty interspace between the absorbent sanitary item and the user's body. The central portion is configured to receive body waste and is made of a material permeable to body fluids.

The upper element may also comprise two side strips, also called "standing gathers", configured to ergonomically encircle the user's legs so as to reduce the clearance between the sanitary absorbent item and the user's body. The side strips may be made of a soft material adapted to come into contact with the user's skin, for example a non-woven tissue. The upper element may also comprise elastic elements coupled to the side strips in order to further reduce the aforementioned clearance, thus reducing the risk of body waste escaping from the aforementioned interspace.

The lower element comprises a layer that is impermeable to body fluids, e.g., made of polyethylene or bioplastic. The lower element may incorporate an additional reinforcing layer associated with the impermeable layer and configured to improve the tear resistance of the absorbent sanitary item. The lower element may also incorporate one or more aesthetic components configured to externally cover the absorbent sanitary item when worn.

An absorbent core is arranged between the upper element and the lower element. Such an absorbent core has the function of absorbing the body fluids that pass through the upper element and retaining them without loss even for several hours. The absorbent core comprises one or more super-absorbent polymers (SAP), e.g., sodium polyacrylate, usually in a granular form, arranged within a covering made of cellulose or other similar fibres.

Intermediate elements can be interposed between the upper element and lower element. For example, a capture and distribution element can be arranged between the upper element and the absorbent core. The capture and distribution element is configured to receive the body fluids passing through the upper element and to distribute them on the absorbent core quickly and evenly, so as to move these fluids away from the user's skin and improve comfort. For this purpose, the capture and distribution element is made of a material that is permeable to body fluids and configured to rapidly capture and distribute such fluids. For example, the capture and distribution element may be made of a non-woven fabric comprising in whole or in part cellulose fibres, polyester fibres or the like. Basically, the capture and distribution element provides a physical separation between the upper element and the absorbent core, preventing the fluids contained in the absorbent core from wetting the upper element. The capture and distribution element may be fixed to the upper element, in which case it is considered an integral part of the upper element.

Further intermediate elements, such as wings (or side panels), are arranged between the upper element and the lower element. Such wings are fixed to both the upper element and the lower element so as to project cantilevered laterally from such elements. Typically there is a pair of front wings fixed to the front part of the absorbent sanitary item and a pair of rear wings fixed to the back part of the absorbent sanitary item. Each front wing is configured to be reversibly coupled, e.g., by means of adhesives or Velcro or the like, to a respective rear wing, so as to encircle the pelvis or the waist of the user and firmly and comfortably fix the absorbent sanitary item to her body. The wings can be made of elastic, tensile-resistant materials.

The packaging of the absorbent sanitary items of the type described above requires, inter alia, the mutual fixing of at least some of the aforementioned elements. In many cases, such fixing occurs by mutually welding such elements by welding apparatuses.

Typically, such welding apparatuses comprise two welding members provided with respective welding surfaces. One of the two welding members is movable with respect to the other welding member between a non-operating position and a welding position.

In the non-operating position, the two welding surfaces are arranged spaced apart from each other on opposite sides with respect to the two elements to be welded. In the welding position, the two welding surfaces contact each other and flatten the two elements to be welded therebetween.

SUMMARY OF THE INVENTION

The Applicant has noted that in order to obtain a good quality uniform weld with the current welding apparatuses, the relative position of the two welding members must be manually adjusted very precisely when they are in the welding position. In particular, in the welding position the two welding surfaces must be perfectly parallel to each other. Such a need is the greater the greater the length of the weld to be made.

The Applicant has found that, as the elements of an absorbent sanitary item have very small thicknesses, small adjustment errors (even by hundredths of a millimetre) can lead to unacceptable welding defects and relative production waste.

For this reason, adjusting the relative position of the welding surfaces of the two welding members when they are in the welding position, while typically performed by expert technicians, is particularly time-consuming Considering that generally several welding apparatuses are provided in a production line and that each of them must be subjected to the aforementioned adjustment operations before starting the packaging operations (and thus also at the time of each size change), it is evident that a manual adjustment such as the one currently performed in the welding apparatuses is particularly heavy in terms of time and resources.

The Applicant has therefore thought to make a welding apparatus in which the desired perfect parallelism of the welding surfaces of the two welding members is achieved easily and immediately, thereby overcoming the drawbacks discussed above.

The present invention therefore relates, in a first aspect thereof, to an apparatus for mutually welding at least two elements of an absorbent sanitary item.

Preferably, the apparatus comprises a supporting structure.

Preferably, the apparatus comprises a first welding member.

Preferably, said first welding member is associated with said supporting structure.

Preferably, said first welding member comprises a first welding surface.

Preferably, said first welding surface is substantially flat.

Preferably, the apparatus comprises a second welding member.

Preferably, said second welding member is associated with said supporting structure.

Preferably, said second welding member comprises a second welding surface.

Preferably, said second welding surface is substantially flat.

Preferably, said second welding member is movable with respect to the first welding member between a non-operating position and a welding position.

Preferably, in the non-operating position, the second welding surface is spaced apart from the first welding surface to allow at least two elements of the absorbent sanitary item to be positioned above the first welding surface.

Preferably, in the welding position the second welding surface is in contact with the first welding surface to allow welding the at least two elements of the absorbent sanitary item.

Preferably, one of said first welding member and said second welding member comprises at least one yielding coupling element.

Preferably, said at least one yielding coupling element is configured to allow a relative displacement between said first welding surface and said second welding surface.

Preferably, said relative displacement is achieved as a result of the mutual contact between the second welding member and the first welding member.

In the following of the present description and in the subsequent claims, the second welding surface is considered to be "in contact" with the first welding surface (or vice versa) when at least two elements to be welded are interposed between the aforementioned welding surfaces, each of said welding surfaces is in contact with a respective element to be welded of said at least two elements to be welded, and the at least two elements to be welded are in contact with each other.

In the following of the present description and in the subsequent claims, the term "yielding coupling element" is used to refer to a non-rigid coupling element, i.e., an element that is capable of deforming when subjected to a stress or, more generally, an element that is capable of allowing a relative displacement of the two members coupled therethrough when at least one of such members is subjected to a stress.

In the following of the present description and in the subsequent claims, a welding surface is understood to be "substantially flat" both when it is perfectly flat, when it has at least one step/height difference to compensate for any differences in material thicknesses in the area to be welded, and when it is defined by several flat surfaces separated from each other which can adapt independently from each other to compensate for any differences in material thicknesses in the area to be welded. The abovementioned material preferably consists of at least one of two overlapping elements intended to be welded to each other.

Thanks to the provision of the yielding coupling elements, the second welding surface is capable of being arranged perfectly parallel to the first welding surface solely as a result of the mutual contact between the aforementioned welding surfaces, thus eliminating the need for manual operations by operators. The desired optimum welding quality is thus achieved.

In a second aspect thereof, the present invention relates to a method for mutually welding at least two elements of an absorbent sanitary item.

Preferably, an apparatus according to the first aspect of the present invention is provided.

Preferably, the second welding member is positioned in said non-operating position.

Preferably, at least two elements of the absorbent sanitary item are positioned above the first welding surface.

Preferably, said second welding member is moved up to reaching said welding position.

Preferably, the at least two elements of the absorbent sanitary item are welded.

By employing an apparatus according to the first aspect of the present invention, the method of the invention achieves the same advantages as those discussed above with reference to the apparatus of the invention.

The present invention may have, in both the aspects discussed above, at least one of the preferred features described below. Such features may therefore be present individually or in combination, except where expressly stated otherwise, both in the apparatus of the first aspect of the present invention and in the method of the second aspect of the present invention.

Preferably, said at least one yielding coupling element is part of said second welding member. In fact, the Applicant considers it preferable for the at least one yielding coupling element to be associated with the welding surface that moves to be arranged parallel to the other welding surface, i.e., the welding surface of the second welding member. Thereby, the other welding surface remains stationary both during the movement of the second welding member from the non-operating position to the welding position and following the contact between the two welding surfaces, thereby defining a stable reference surface for the correct achievement of the perfect parallelism between the two welding surfaces.

Preferably, said second welding member comprises a mounting head.

Preferably, said mounting head is associated with said supporting structure.

Preferably, said second welding member comprises a welding block.

Preferably, said welding block is associated with said mounting head. The mounting head is therefore interposed between the supporting structure and the welding block.

Preferably, said welding block comprises said second welding surface. The welding block is therefore interposed between the second welding surface and the mounting head.

Preferably, said at least one yielding coupling element is interposed between said welding block and said mounting head.

Preferably, said welding block comprises a supporting plate associated with said mounting head.

Preferably, said at least one yielding coupling element is interposed between said mounting head and said supporting plate.

Preferably, said welding block comprises a welding head associated with said supporting plate and comprising said second welding surface.

Preferably, said welding head is rigidly constrained to said supporting plate.

Preferably, said second welding member comprises a compensation chamber operatively interposed between said supporting plate and at least one portion of said mounting head. Such a compensation chamber allows the supporting plate (and thus the welding head) to move with respect to the mounting head as a result of the mutual contact between the second welding member and the first welding member, thereby achieving the desired parallelism between the first welding surface and the second welding surface.

Preferably, said mounting head comprises an abutment surface.

Preferably, said abutment surface is an undercut surface.

Preferably, said supporting plate comprises a shoulder.

Preferably, in the non-operating position, said shoulder is in abutment against said abutment surface. This expedient allows the mounting head to stably support the supporting plate without hindering possible relative displacement between supporting plate and mounting head as a result of the mutual contact between the second welding member and the first welding member.

Preferably, said supporting structure comprises a first supporting block associated with said first welding member.

Preferably, said supporting structure comprises a second supporting block associated with said mounting head.

Preferably, said apparatus comprises adjustment members configured to adjust the position of said mounting head with respect to said second supporting block.

Preferably, said adjustment members allow a linear displacement of said mounting head with respect to said second supporting block. Thereby the correct positioning of the second welding surface above the first welding surface can be achieved before or after bringing the aforementioned welding surfaces into mutual contact.

In a first preferred embodiment, said at least one yielding coupling element comprises at least one elastic element, e.g., at least one spring.

Preferably, a plurality of springs is provided.

Preferably, said springs are arranged along a predetermined direction.

Preferably, said second welding surface is substantially rectangular in shape.

Preferably, said second welding surface extends along a major axis and a minor axis orthogonal to the major axis.

Preferably, said springs are arranged along a direction coinciding with or parallel to said major axis.

In a second preferred embodiment, said at least one yielding coupling element comprises at least one air bearing.

In a further preferred embodiment, said at least one yielding coupling element comprises at least one spherical pin.

Preferably, the apparatus of the invention is configured to perform an ultrasonic welding. Such a type of welding enables the materials of the two elements to be welded together in an extremely precise and localised manner.

In such a case, in a first preferred embodiment of said apparatus, said second welding member comprises an anvil of an ultrasonic welding device and said first welding member comprises a sonotrode of said ultrasonic welding device.

Preferably, said welding block defines said anvil.

In a second preferred embodiment of the aforesaid apparatus, said first welding member comprises an anvil of an ultrasonic welding device and said second welding member comprises a sonotrode of said ultrasonic welding device.

BRIEF DESCRIPTION OF THE DRAWINGS

Further features and advantages of the present invention will become clearer from the following detailed description of a preferred embodiment thereof, this description being made with reference to the appended drawings and being provided by way of indicative and non-limiting example, in which.

DETAILED DESCRIPTION OF THE INVENTION

Figure 2:
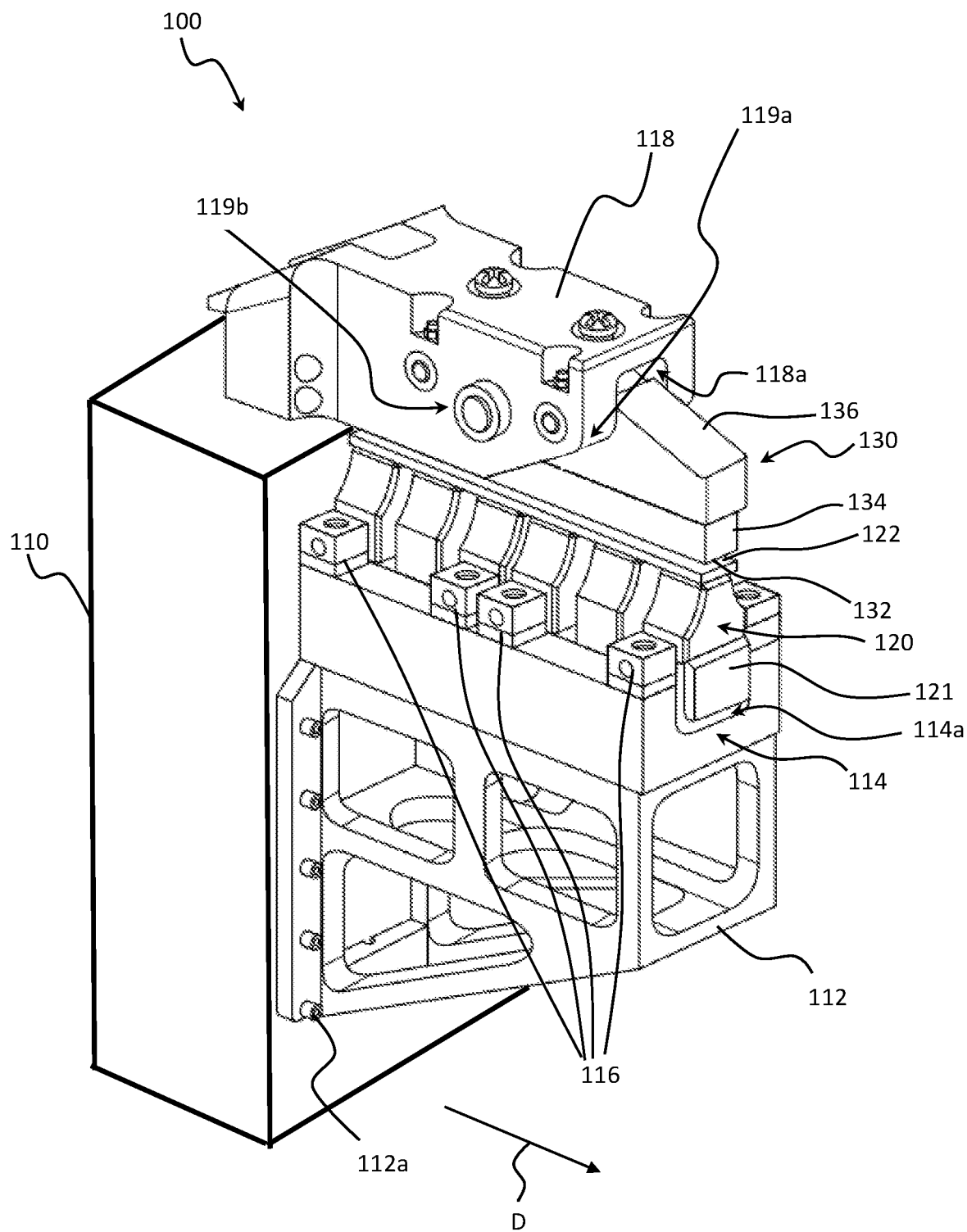
FIG. 2 is a schematic perspective view of an apparatus which, in accordance with the present invention, is used to mutually weld at least two elements of the absorbent sanitary item of FIG. 1.
Figure 3:
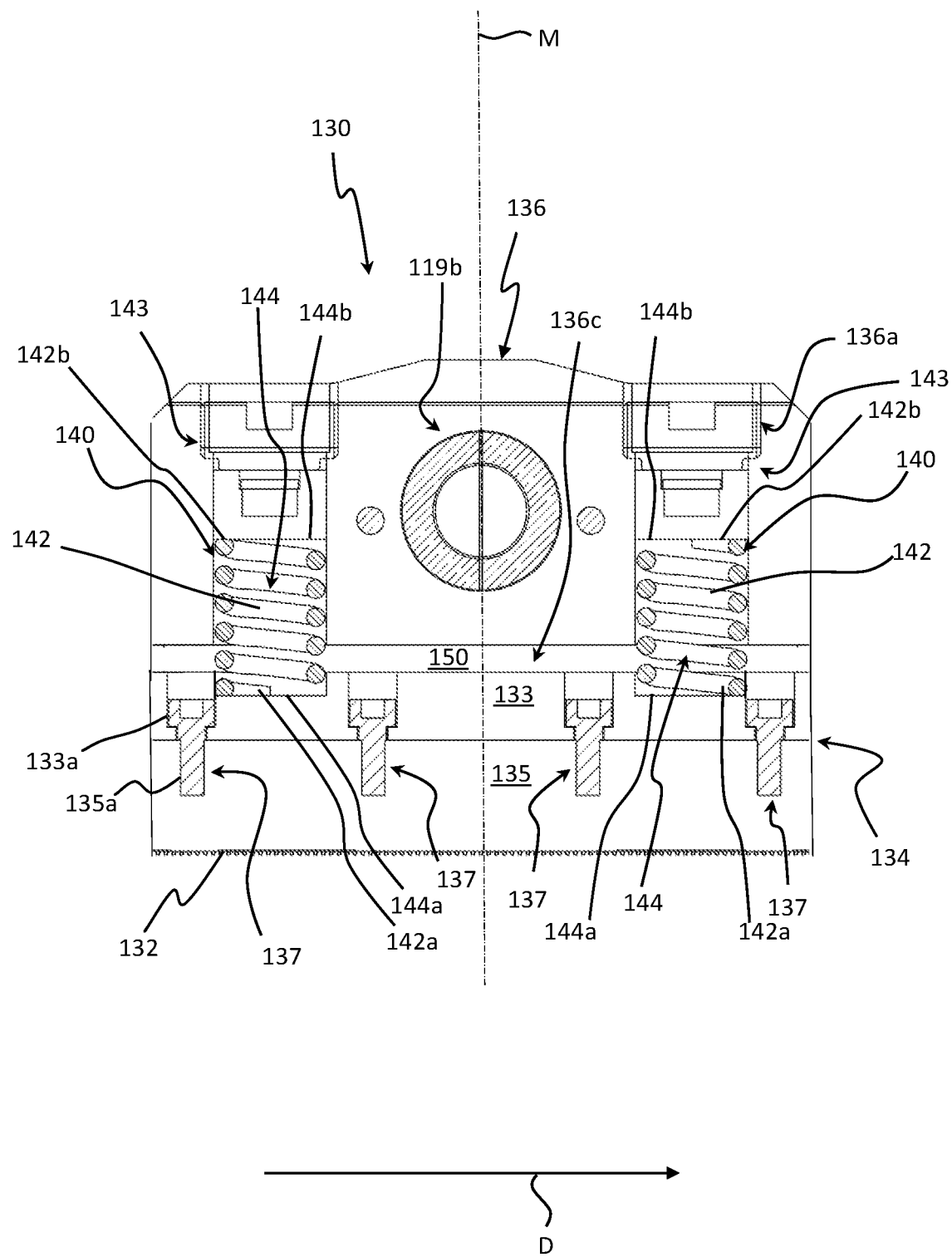
FIG. 3 is a schematic front sectional view of a part of an embodiment of the apparatus of FIG. 2.
Figure 4:
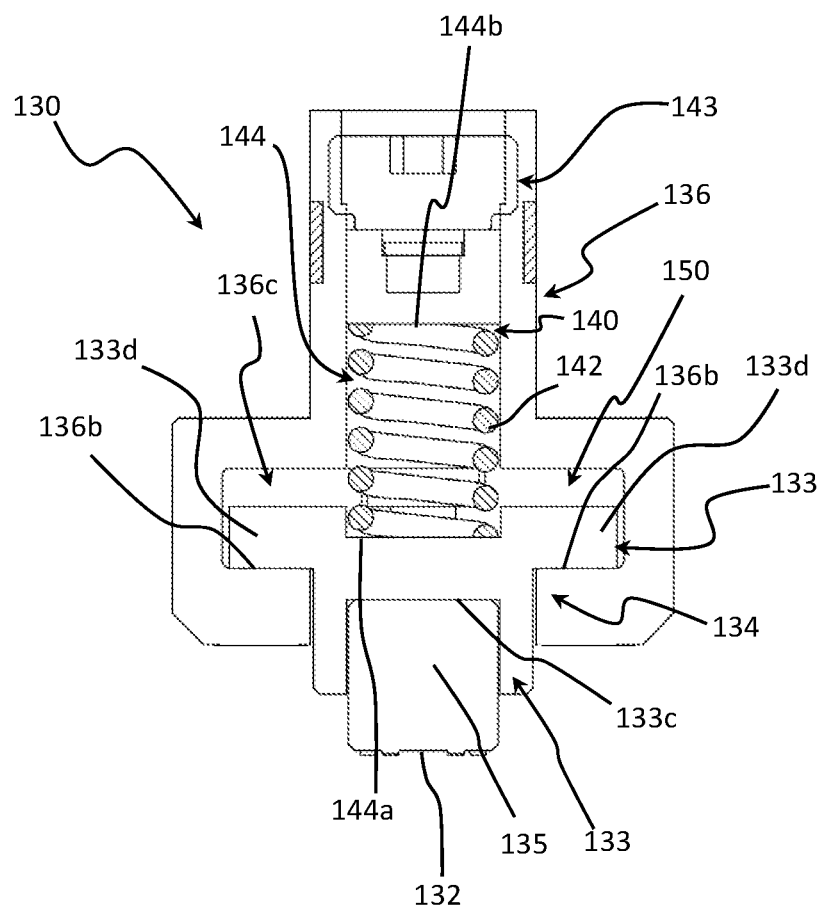
FIG. 4 is a sectional schematic side view of the part of FIG. 3.

In FIGS. 2-4, the numerical reference 100 is used to indicate an apparatus for mutually welding at least two elements of an absorbent sanitary item in accordance with the present invention.

Non-limiting examples of absorbent sanitary items comprising elements which can be welded by the apparatus 100 are baby nappies, absorbent sanitary items for women, diapers and napkins for incontinent persons and the like.

Figure 1:
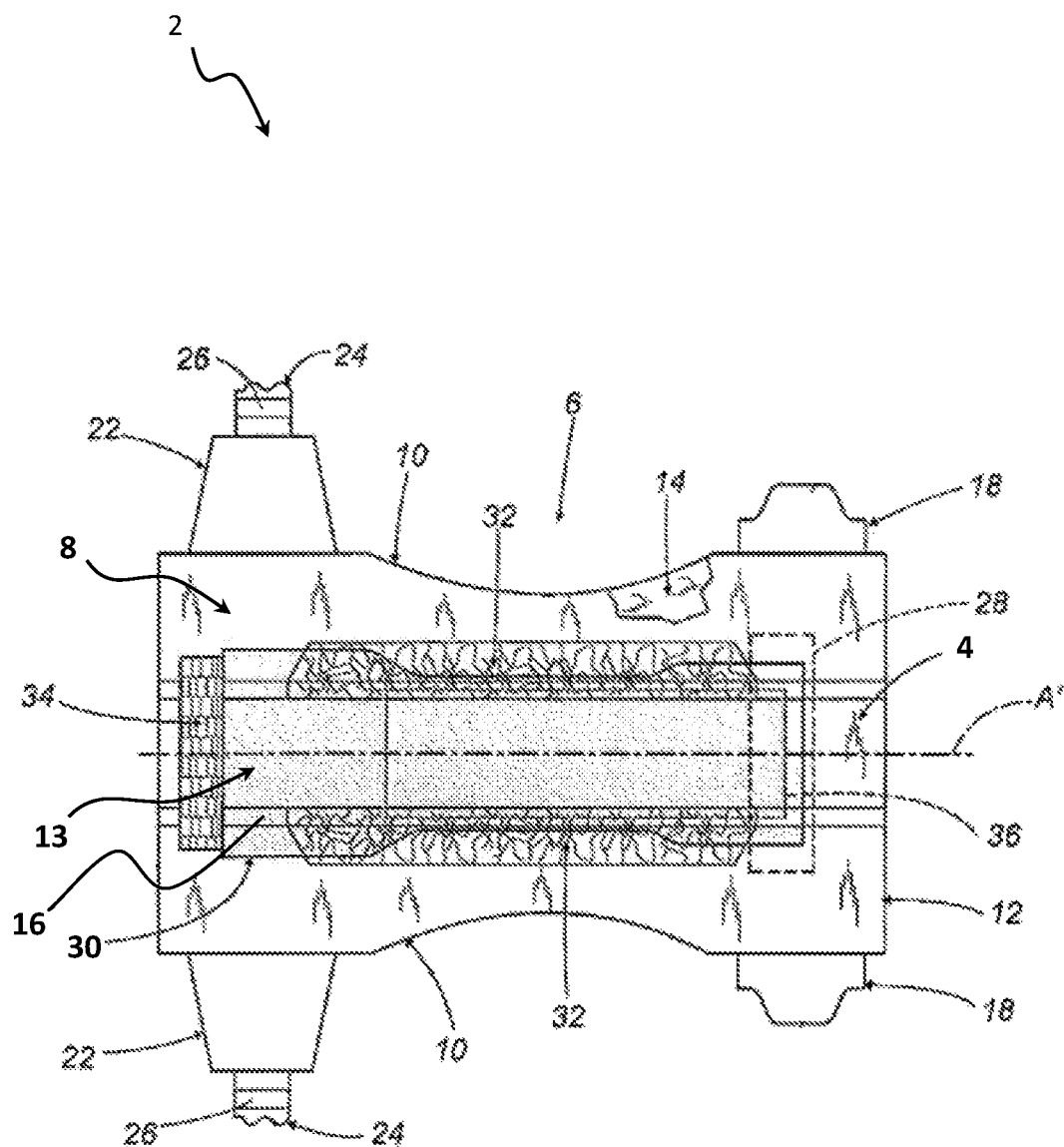
FIG. 1 is a schematic plan view of an absorbent sanitary item which can also be made by the apparatus of FIG. 2.

Without losing any generality, explicit reference will be made below to a specific example of an absorbent sanitary item, such as the one shown in FIG. 1 and indicated by numerical reference 2. In particular, it is a baby nappy. What it is described, however, has similar application to different types of absorbent sanitary items, such as those listed above.

The item 2 has, along a longitudinal axis A' thereof, a front part 4, wearable on the front part of the user's body, a back part 8, wearable on the back part of the user's body, and a central part 6 arranged between the front part 4 and the back part 8 and wearable between the user's legs. In particular, a recess 10, or shaping, is provided at the central portion 6, the recess 10 being defined by two arched portions which are symmetrical with respect to the longitudinal axis A'.

The item 2 comprises a plurality of elements that must be mutually associated and/or welded.

In particular, the item 2 comprises two primary elements 12, 14 extending longitudinally from the front part 4 to the back part 8 of the item 2. More in particular, the aforementioned primary elements include an upper element 12, also referred to as "topsheet", and a lower element 14, also referred to as "backsheet". Both the upper element 12 and the lower element 14 are substantially rectangular in shape, apart from the aforementioned recesses 10.

The upper element 12 and the lower element 14 define, respectively, an inner face and an outer face of the item 2.

The upper element 12 is overlapped to the lower element 14 and is configured to be arranged in a position close to the user's body when the item 2 is worn by the user.

The upper element 12 is made of a permeable material (e.g., non-woven fabric) and comprises a central portion 13 which, in use, comes into contact with the user's skin, or is arranged close thereto, so as to form an empty interspace between the item 2 and the user's body. The central portion 13 is configured to receive body waste and is made of a material permeable to body fluids.

The upper element 12 may further comprise two side strips 30, also called "standing gathers", arranged on opposite sides with respect to the longitudinal axis A' and configured to ergonomically encircle the user's legs so as to reduce the clearance between the item 2 and the user's body. The side strips 30 may be made of a soft material adapted to come into contact with the user's skin, for example a non-woven fabric.

The upper element 12 may also comprise elastic elements 32 coupled to the side strips 30 so as to further reduce the aforementioned clearance.

The lower element 14 comprises a layer that is impermeable to body fluids, e.g., made of polyethylene or bioplastic. The lower element 14 may incorporate an additional reinforcing layer associated with the impermeable layer and configured to improve the tear resistance of the item 2. The lower element 14 may also incorporate one or more aesthetic components configured to externally cover the item 2 when worn.

An absorbent core 16 is arranged in the central portion 13. Such an absorbent core 16 has the function of absorbing the body fluids that pass through the upper element 12 and retaining them without loss even for several hours. The absorbent core 16 comprises one or more super-absorbent polymers (SAP), e.g., sodium polyacrylate, usually in a granular form, arranged within a covering made of cellulose or other similar fibres.

A capture and distribution element 36 is arranged between the upper element 12 and the absorbent core 16. The capture and distribution element 36 is made of a material permeable to body fluids and is configured to receive the body fluids passing through the upper element 12 and distribute them quickly and evenly over the absorbent core 16. For example, the capture and distribution element 36 may be made of a non-woven fabric comprising in whole or in part cellulose fibres, polyester fibres or the like. Basically, the capture and distribution element 36 provides a physical separation between the upper element 12 and the absorbent core 16, thus preventing the fluids contained in the absorbent core 16 from wetting the upper element 12. The capture and distribution element 36 is welded along the outline of the absorbent core 16 and may be fixed to the upper element 12, in which case it is considered an integral part of the upper element 12.

Wings 18, 22 (or side panels) are fixed to both the upper element 12 and the lower element 14 so as to project laterally from such elements 12, 14, transversally to the longitudinal axis A'. A pair of front wings 18 is fixed to the front part 4 of the item 2 on opposite sides with respect to the longitudinal axis A'. Similarly, a pair of rear wings 22 is fixed to the rear part 8 of the item 2 on opposite sides with respect to the longitudinal axis A'.

Each front wing 18 is configured to reversibly couple to a respective rear wing 22, so as to encircle the user's pelvis or waist and firmly or comfortably fix the item 2 to her body. The wings 18, 22 can be made of elastic, tensile-resistant materials. In particular, an additional wing 24 is applied to each of the rear flaps 22, the additional wing 24 being provided with an adhesive strip 26, running parallel to the longitudinal axis A'. The additional wing 24 is configured to adhere, in use, to a corresponding front strip 28 applied to the front part 4 of the outer face of the lower element 14. The rear wings 22 with the additional wings 24 define, together with the front strip 28, the closing members of the item 2. The adhesive strip 26 can be replaced, according to a variant, with a strip of Velcro® or similar materials.

An elastic tape 34 is applied, transversally to the longitudinal axis A', to the inner face of the lower element 14 at the rear portion 8 of the item 2.

The two elements of the item 2 which can be welded by the apparatus 100 can be, for example, the side strip 30 and the upper element 12.

With reference to FIG. 2, the apparatus 100 allows to carry out an ultrasonic welding.

In such a case, the apparatus 100 comprises a first welding member 120 and a second welding member 130, both mounted on a supporting structure 110 and configured to be arranged one above the other.

For simplicity of illustration, the supporting structure 110 is shown in an extremely schematic manner, being of a conventional type.

In the example embodiment illustrated herein, the first welding member 120 comprises a sonotrode and the second welding member 130 comprises an anvil. However, a different example embodiment is envisaged in which the first welding member 120 comprises an anvil and the second welding member 130 comprises a sonotrode.

In both the example embodiments discussed above, the first welding member 120 comprises a first flat welding surface 122, and the second welding member 130 comprises a second flat welding surface 132. Such welding surfaces 122, 132 are intended to go into mutual contact after the two elements to be welded have been arranged therebetween.

Preferably, as in the example illustrated herein, the two welding surfaces 122, 132 have substantially equal dimensions and a substantially rectangular shape. In particular, both the welding surfaces 122, 132 extend along a respective major axis and a respective minor axis orthogonal to the major axis.

In the specific example illustrated herein, the supporting structure 110 comprises a supporting frame 112 on which the first welding member 120 is mounted.

The supporting frame 112 is fixed to the supporting structure 110 by a plurality of fixing elements 112*a*.

The first welding member 120 is fixed to a first supporting block 114 by a plurality of tightening elements 116. The first supporting block 114 in turn is fixed to the supporting frame 112. Consequently, the first welding member 120 is integral with the supporting structure 110 and the first welding surface 122 has a predetermined position with respect to the supporting structure 110, effectively constituting a resting plane for the two elements to be welded.

The first supporting block 114 has a substantially parallelepiped shape and comprises, on a surface thereof facing the first welding surface 122, a longitudinal groove 114a in which a coupling portion 121 of the first welding member 120 is inserted.

The second welding member 130 is associated with the supporting structure 110 in a non-fixed manner, i.e., it can be moved with respect to the supporting structure 110 and thus also with respect to the first welding member 120.

In particular, the second welding member 130 can be displaced between a non-operating position and a welding position.

In the non-operating position, the second welding surface 132 is moved away from the first welding surface 122 so that there is enough space above the first welding surface 122 to position the two elements to be welded.

In the welding position, the second welding surface 132 is brought into contact with the first welding surface 122, so as to allow welding of the two elements to be welded.

The supporting structure 110 further comprises a second supporting block 118 on which the second welding member 130 is mounted.

The second welding member 130 comprises a welding block 134, on which the second welding surface 132 is defined, and a mounting head 136, associated with the welding block 134 and mounted on the second supporting block 118.

As shown in FIGS. 3 and 4, in an embodiment thereof the welding block 134 comprises a supporting plate 133 and a welding head 135. The supporting plate 133 is supported by the mounting head 136, while the welding head 135 is rigidly constrained to the supporting plate 133.

In the specific example illustrated herein, the rigid constraint between welding head 135 and supporting plate 133 is achieved by a plurality of fixing screws 137 inserted into respective through holes 133a formed in the supporting plate 133 and screwed into respective threaded blind holes 135a formed in the welding head 135.

The blind holes 135a, and thus the fixing screws 137, are arranged side by side and aligned along a direction D parallel to the major axis of the second welding surface 132. The blind holes 135a are located symmetrically with respect to a median plane M of the second welding member 130.

The welding head 135, which defines the anvil of the apparatus 100, has a parallelepiped shape and comprises the second welding surface 132.

As shown in FIG. 4, the supporting plate 133 comprises, on a surface thereof facing the second welding surface 132, a longitudinal recess 133c where the welding head 135 is partially inserted.

The supporting plate 133 further comprises shoulders 133d extending along a direction perpendicular to the direction D on the opposite side with respect to the longitudinal recess 133c.

As shown in FIG. 2, the second supporting block 118 comprises, on a surface thereof facing the second welding surface 132, a longitudinal groove 118a where the mounting head 136 is partially inserted. First adjustment members 119a are also provided, which are configured to adjust the position of the mounting head 136 with respect to the second supporting block 118 along the direction of the longitudinal groove 118a and second adjustment members 119b configured to adjust the angular position of the mounting head 136 with respect to the second supporting block 118.

In the non-limiting example shown in FIGS. 2-4, the second welding member 130 comprises yielding coupling elements 140 that allow a relative displacement between the first welding surface 122 and the second welding surface 132 in the welding position, i.e. when the second welding member 130 comes into contact with the first welding member 120 with the two elements to be welded interposed between the two welding surfaces 122, 132.

In particular, the yielding coupling elements 140 are interposed between the supporting plate 133 and the mounting head 136.

In the example described and illustrated herein, the yielding coupling elements 140 are elastic elements. In particular, they are defined by a pair of helical springs 142.

Each spring 142 is arranged in a respective housing seat 144 provided partly in the supporting plate 133 and partly in the mounting head 136.

In the non-limiting example of FIG. 3, the housing seats 144 are substantially cylindrical in shape and are mainly defined in the mounting head 136.

One end 142a of the spring 142 rests on a base surface 144a of the part of each housing seat 144 defined in the supporting plate 133.

The opposite end 142b of the spring 142 rests on a base surface 144b of a preloading member 143 inserted in a through hole 136a formed in the part of each housing seat 144 defined in the mounting head 136.

The housing seats 144, and thus the springs 142, are arranged side by side and aligned along the direction D on opposite sides with respect to the median plane M.

The second welding member 130 comprises a compensation chamber 150 defined in a cavity 136c of the mounting head 136 and operatively interposed between a portion of the mounting head 136 and the supporting plate 133.

As shown in FIG. 4, the mounting head 136 comprises a pair of undercut abutment surfaces 136b configured to abut against the shoulders 133d of the supporting plate 133 when the second welding member 130 is in the non-operating position. When the welding member 130 is instead in the welding position, at least one of the shoulders 136b can move at least partially away from the respective abutment surface 136b.

Herein below a description of how the apparatus 100 performs the welding of the two elements to be welded is made.

At first, the second welding member 130 is positioned in the non-operating position, i.e., spaced apart from the first welding member 120.

The two elements to be welded are positioned on the first welding surface 122.

The second welding member 130 is then moved up to reaching the welding position, in which the second welding surface 132 flattens the two elements to be welded against each other and both against the first welding surface 122.

Thanks to the provision of the compensation chamber 150 and springs 142 interposed between the supporting plate 133 and the mounting head 136, when the welding surfaces 122 and 132 go into contact with each other the supporting plate 133 tilts with respect to the mounting head 136, allowing the second welding surface 132 to be arranged perfectly parallel to the first welding surface 122. The aforementioned two elements can thus be mutually welded.

Obviously, a person skilled in the art, in order to satisfy specific and contingent needs, can make numerous changes and variations to the invention described above while remaining within the scope of protection defined by the following claims.

The invention claimed is:

1. An apparatus for mutually welding at least two elements of an absorbent sanitary item, comprising:
   a supporting structure;

a first welding member associated with said supporting structure and comprising a first welding surface;

a second welding member associated with said supporting structure and comprising a second welding surface, wherein said second welding member is movable with respect to the first welding member between:

- a non-operating position, in which the second welding surface is spaced apart from the first welding surface to allow at least two elements of the absorbent sanitary item to be positioned above the first welding surface, and
- a welding position, in which the second welding surface is in contact with the first welding surface to allow welding the at least two elements of the absorbent sanitary item;

wherein said second welding member comprises at least one yielding coupling element configured to allow a relative displacement between said first welding surface and said second welding surface as a result of a mutual contact between the second welding member and the first welding member, wherein said at least one yielding coupling element is part of said second welding member and said second welding member comprises a mounting head associated with said supporting structure and a welding block associated with said mounting head and comprising said second welding surface, wherein said at least one yielding coupling element is interposed between said welding block and said mounting head;

wherein said supporting structure comprises a first supporting block associated with said first welding member and a second supporting block associated with said mounting head; and wherein said apparatus comprises adjustment members configured to adjust the position of said mounting head with respect to said second supporting block.

2. The apparatus according to claim 1, wherein said adjustment members allow a linear displacement of said mounting head with respect to said second supporting block.

3. The apparatus according to claim 1, wherein said at least one yielding coupling element comprises at least one elastic element or at least one air bearing.

4. The apparatus according to claim 1, wherein said at least one yielding coupling element comprises a plurality of springs arranged along a predetermined direction.

5. The apparatus according to claim 1, wherein said second welding member comprises an anvil of an ultrasonic welding device and said first welding member comprises a sonotrode of said ultrasonic welding device.

6. The apparatus according to claim 1, wherein said first welding member comprises an anvil of an ultrasonic welding device and said second welding member comprises a sonotrode of said ultrasonic welding device.

7. A method for mutually welding at least two elements of an absorbent sanitary item, comprising:
providing an apparatus according to claim 1;
positioning the second welding member in said non-operating position;
positioning the at least two elements of the absorbent sanitary item above the first welding surface;
moving said second welding member up to reaching said welding position;
welding the at least two elements of the absorbent sanitary item.

* * * * *